(12) United States Patent
Fujii et al.

(10) Patent No.: US 11,130,263 B2
(45) Date of Patent: Sep. 28, 2021

(54) DECORATIVE SHEET, DECORATIVE RESIN MOLDED ARTICLE, AND METHOD FOR PRODUCING SAME

(71) Applicant: Dai Nippon Printing Co., Ltd., Tokyo (JP)

(72) Inventors: Toshifumi Fujii, Tokyo (JP); Yuri Kitahara, Tokyo (JP); Nobuo Saito, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 16/498,564

(22) PCT Filed: Mar. 29, 2018

(86) PCT No.: PCT/JP2018/013364
§ 371 (c)(1),
(2) Date: Sep. 27, 2019

(87) PCT Pub. No.: WO2018/181775
PCT Pub. Date: Oct. 4, 2018

(65) Prior Publication Data
US 2020/0061885 A1    Feb. 27, 2020

(30) Foreign Application Priority Data

Mar. 31, 2017 (JP) .............................. JP2017-070835
Sep. 27, 2017 (JP) .............................. JP2017-186226

(51) Int. Cl.
*B29C 45/14* (2006.01)
*B32B 27/30* (2006.01)
(Continued)

(52) U.S. Cl.
CPC .............. *B29C 45/14* (2013.01); *B32B 27/30* (2013.01); *B29C 2791/006* (2013.01);
(Continued)

(58) Field of Classification Search
CPC ....... Y10T 428/24521; Y10T 428/2495; B32B 3/30; B32B 27/30; B32B 27/365;
(Continued)

(56) References Cited

U.S. PATENT DOCUMENTS 6,638,602 B2 * 10/2003 Itada .......................... C09J 7/22
428/172
2011/0206884 A1    8/2011 Nakamura et al.
(Continued)

FOREIGN PATENT DOCUMENTS

JP    S50-19132 B1    7/1975
JP    S61-17255 B2    5/1986
(Continued)

OTHER PUBLICATIONS

International Search Report dated Jul. 3, 2018, issued for PCT/JP2018/013364.

*Primary Examiner* — Donald J Loney
(74) *Attorney, Agent, or Firm* — Locke Lord LLP

(57) ABSTRACT

Provided is a decorative sheet having an excellent decorative appearance due to surface unevenness, as well as excellent abrasion resistance and moldability. This decorative sheet includes at least a substrate layer and a surface protective layer located on the surface of the substrate layer, wherein: the surface protective layer has a cross section in the direction of thickness; the cross section has an unevenness formed, on such surface side, by a repeating pattern including recesses and projections which are mutually adjacent; and the ratio of the measured average surface protective layer thickness (μm) at the recesses, $T_v$, and the measured average surface protective layer thickness (μm) at the projections, $T_p$, (average $T_p$/average $T_v$) satisfies the relationship of $0.10 \leq T_p$ average/$T_v$ average$\leq 0.35$.

20 Claims, 2 Drawing Sheets

(51) Int. Cl.
B32B 15/08 (2006.01)
B32B 27/36 (2006.01)
B32B 33/00 (2006.01)

(52) U.S. Cl.
CPC ............... *B32B 15/08* (2013.01); *B32B 27/36* (2013.01); *B32B 33/00* (2013.01); *B32B 2367/00* (2013.01)

(58) Field of Classification Search
CPC . B32B 2367/00; B32B 2451/00; B29C 45/14; B29C 35/08
See application file for complete search history.

(56) References Cited

U.S. PATENT DOCUMENTS

| | | |
|---|---|---|
| 2013/0213578 A1 | 8/2013 | Nakamura et al. |
| 2014/0255669 A1* | 9/2014 | Akou ..................... B32B 25/14 428/203 |
| 2018/0043653 A1 | 2/2018 | Sutou et al. |

FOREIGN PATENT DOCUMENTS

| | | |
|---|---|---|
| JP | 2004-322501 A | 11/2004 |
| JP | 2006-095992 A | 4/2006 |
| JP | 2006-118163 A | 5/2006 |
| JP | 2009-29089 A | 2/2009 |
| JP | 2012-101549 A | 5/2012 |
| JP | 2016-190481 A | 11/2016 |
| JP | 2018-058333 A | 4/2018 |
| WO | 2013/133375 A1 | 9/2013 |

\* cited by examiner

DECORATIVE SHEET, DECORATIVE RESIN MOLDED ARTICLE, AND METHOD FOR PRODUCING SAME

TECHNICAL FIELD

The present invention relates to a decorative sheet, a decorative resin molded article, and methods for producing these.

BACKGROUND ART

Decorative resin molded articles in which a decorative sheet is laminated on the surface of resin molded articles are used in interior parts for vehicles, interior materials for building materials, housings for home appliances and the like. As methods for molding such decorative resin molded articles, an insert molding method (for example, see Patent Document 1) in which a decorative sheet is molded into a three-dimensional shape using a vacuum mold in advance, the molded sheet is inserted into an injection mold, a resin in a fluid state is injected into the mold, and the resin and the molded sheet are integrated, an injection molding simultaneous decorating method (for example, see Patent Document 2 and Patent Document 3) in which a decorative sheet inserted into the mold at the time of injection molding is integrated with the molten resin injected and poured into the cavity, and the surface of the resin molded body is decorated, an overlay method (for example, see Patent Document 4) in which a decorative sheet is pasted onto a resin molded body which has been molded in advance while performing heating or pressurization, and the like are known.

Hitherto, a technique for enhancing the realistic design feeling of a decorative sheet by providing an uneven shape on the surface of the decorative sheet is known. As a method for providing an uneven shape on the surface of a decorative sheet, for example, a method in which a colored layer is provided on a transparent resin film, embossing is performed on the colored layer, and an uneven shape in which a colored layer is protruded on the transparent resin film side is known.

PRIOR ART DOCUMENTS

Patent Documents

Patent Document 1: Japanese Patent Laid-open Publication No. 2004-322501
Patent Document 2: Japanese Patent Publication No. 50-19132
Patent Document 3: Japanese Patent Publication No. 61-17255
Patent Document 4: Japanese Patent Laid-open Publication No. 2012-101549

SUMMARY OF THE INVENTION

Problems to be Solved by the Invention

As a decorative sheet having an uneven shape on the surface, those of which the surface is embossed are known, but there is a limit to the height difference of an uneven shape capable of being formed on a decorative sheet and there is a case in which the stereoscopic feeling of appearance is insufficient by simply providing an uneven shape.

Furthermore, the surface of decorative sheets to be used in interior parts for vehicles, interior materials for building materials, housings for home appliances and the like are required to exhibit excellent abrasion resistance, but there is a problem that the load due to friction is concentrated on the projection portion and the abrasion resistance is likely to deteriorate in a case in which the uneven shape is provided by embossing.

Under such circumstances, a main object of the present invention is to provide a decorative sheet exhibiting excellent design feeling due to appearance based on the uneven shape of the surface and further excellent abrasion resistance and moldability. Another object of the present invention is to provide a method for producing the decorative sheet, a decorative resin molded article which is obtained utilizing the decorative sheet and exhibits excellent design feeling due to appearance and excellent abrasion resistance, and a method for producing the decorative resin molded article.

Means for Solving the Problem

The present inventors have conducted intensively investigations to solve the above problems. As a result, it has been found out that a decorative sheet which includes at least a base material layer and a surface protective layer located on a surface of the base material layer and in which the surface protective layer has a cross section in the thickness direction, the cross section has an uneven shape in which a pattern including a projection portion and a recess portion adjacent to each other is repeated on the surface side, and a relation of 0.10 average value of $T_p$/average value of $T_v$ 0.35 is satisfied in the case of measuring the ratio (average value of $T_p$/average value of $T_v$) of an average value (μm) of the thicknesses $T_p$ of the surface protective layer at the projection portions to an average value (μm) of the thicknesses $T_v$ of the surface protective layer at the recess portions exhibits excellent design feeling due to appearance based on the uneven shape of the surface and further excellent abrasion resistance and moldability. Furthermore, it has also been found out that the surface protective layer of a decorative resin molded article after molding suitably satisfies the relation of 0.20 average value of $T_p$/average value of $T_v$ 0.45, excellent design feeling due to appearance having stereoscopic feeling can be imparted to the decorative resin molded article, and excellent abrasion resistance can also be imparted to the decorative resin molded article by use of the decorative sheet of the present invention. The present invention has been completed by further conducting investigations based on this finding.

In other words, the present invention provides the invention of the following aspects.

Item 1. A decorative sheet including: at least a base material layer and a surface protective layer located on a surface of the base material layer, in which
the surface protective layer has a cross section in a thickness direction,
the cross section has an uneven shape in which a pattern including a projection portion and a recess portion adjacent to each other is repeated on the surface side, and
a relation of 0.10 average value of $T_p$/average value of $T_v$ 0.35 is satisfied in a case of measuring a ratio (average value of $T_p$/average value of $T_v$) of an average value (μm) of thicknesses $T_p$ of the surface protective layer at the projection portions to an average value (μm) of thicknesses $T_v$ of the surface protective layer at the recess portions.

Item 2. The decorative sheet according to paragraph 1, in which the surface protective layer is a cured product of an ionizing radiation curable resin composition containing polycarbonate (meth)acrylate.

Item 3. The decorative sheet according to paragraph 1 or 2, in which the average value (μm) of $T_p$ is 3 μm or more.

Item 4. The decorative sheet according to any one of paragraphs 1 to 3, in which the average value (μm) of $T_v$ is 30 μm or less.

Item 5. The decorative sheet according to any one of paragraphs 1 to 4, further including a primer layer, in which
the primer layer is in contact with a surface on the base material layer side of the surface protective layer.

Item 6. The decorative sheet according to any one of paragraphs 1 to 5, further including a decorative layer between the surface protective layer and the base material layer.

Item 7. A method for producing the decorative sheet according to any one of paragraphs 1 to 6, the method including:
a step of forming an uneven shape on one side of the base material layer; and
a step of forming the surface protective layer on a surface side on which the uneven shape is formed of the base material layer.

Item 8. A decorative resin molded article including at least a molded resin layer, a base material layer, and a surface protective layer located on a surface, in which
the surface protective layer has a cross section in a thickness direction,
the cross section has an uneven shape in which a pattern including a projection portion and a recess portion adjacent to each other is repeated on the surface side, and
a relation of 0.20 average value of $T_p$/average value of $T_v$ 0.45 is satisfied in a case of measuring a ratio (average value of $T_p$/average value of $T_v$) of an average value (μm) of thicknesses $T_p$ of the surface protective layer at the projection portions to an average value (μm) of thicknesses $T_v$ of the surface protective layer at the recess portions.

Item 9. A method for producing a decorative resin molded article, the method including a step of laminating a molded resin layer by injecting a resin on the base material layer side of the decorative sheet according to any one of paragraphs 1 to 6.

Advantages of the Invention

According to the present invention, it is possible to provide a decorative sheet exhibiting excellent design feeling due to appearance based on the uneven shape of the surface and further excellent abrasion resistance and moldability. In addition, according to the present invention, it is possible to provide a method for producing the decorative sheet, a decorative resin molded article which is obtained utilizing the decorative sheet and exhibits excellent design feeling due to appearance and excellent abrasion resistance, and a method for producing the decorative resin molded article.

EMBODIMENTS OF THE INVENTION

1. Decorative Sheet

The decorative sheet of the present invention is a decorative sheet which includes at least a base material layer and a surface protective layer located on a surface and in which the surface protective layer has a cross section in a thickness direction, the cross section has an uneven shape in which a pattern including a projection portion and a recess portion adjacent to each other is repeated on the surface side, and a relation of 0.10≤average value of $T_p$/average value of $T_v$ 0.35 is satisfied in the case of measuring a ratio (average value of $T_p$/average value of $T_v$) of an average value (μm) of thicknesses $T_p$ of the surface protective layer at the projection portions to an average value (μm) of thicknesses $T_v$ of the surface protective layer at the recess portions. In other words, an uneven shape is formed on the surface side of the surface protective layer, and the relation of 0.10 average value of $T_p$/average value of $T_v$ 0.35 is satisfied in the case of measuring the ratio (average value of $T_p$/average value of $T_v$) of the average value (μm) of thicknesses $T_p$ of the surface protective layer at the plurality of projection portions to the average value (μm) of thicknesses $T_v$ of the surface protective layer at the plurality of recess portions in the uneven shape having a plurality of projection portions and a plurality of recess portions continuous in one direction of the surface protective layer. The decorative sheet of the present invention has such a specific configuration and thus is a decorative sheet which can exhibit excellent design feeling due to appearance and further exhibits excellent abrasion resistance and moldability. Moreover, a decorative resin molded article exhibiting excellent design feeling due to appearance and abrasion resistance is obtained by use of the decorative sheet.

Hereinafter, the decorative sheet of the present invention will be described in detail. Incidentally, in the present specification, the numerical range indicated by "to" means "or more" and "or less". For example, the notation of 2 to 15 mm means 2 mm or more and 15 mm or less. In addition, in the present specification, "(meth)acrylate" means "acrylate or methacrylate", and the same applies to other similar ones.

Laminated Structure of Decorative Sheet

Figure 1:
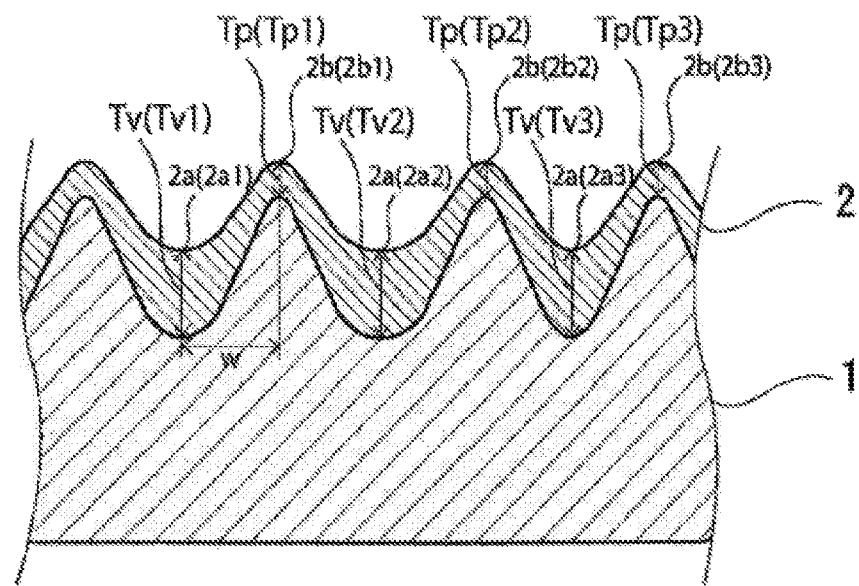
FIG. 1 is a schematic diagram of a cross-sectional structure of an embodiment of a decorative sheet of the present invention.
Figure 2:
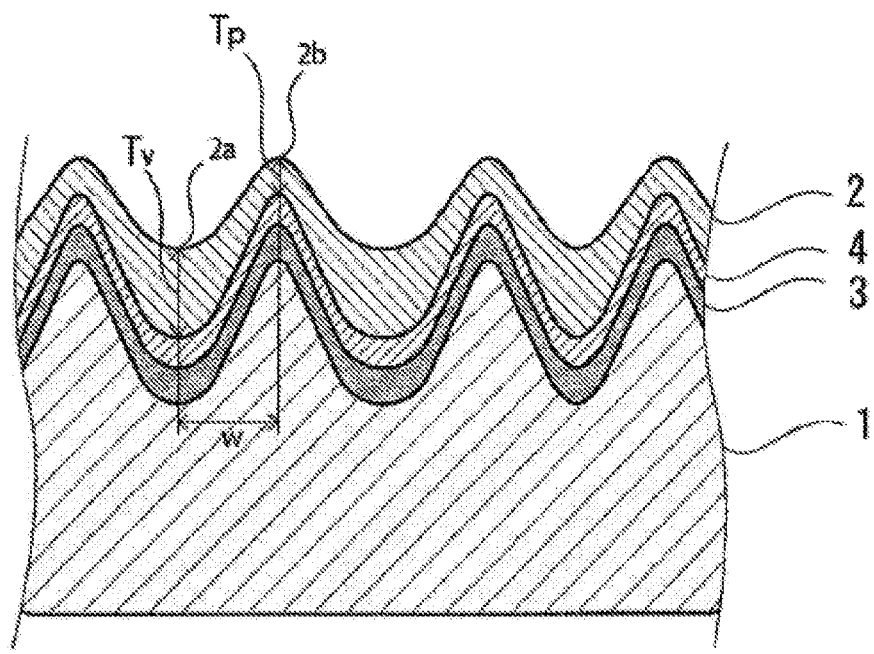
FIG. 2 is a schematic diagram of a cross-sectional structure of an embodiment of a decorative sheet of the present invention.

As illustrated in FIGS. 1 and 2, the decorative sheet of the present invention has a laminated structure in which at least a base material layer 1 and a surface protective layer 2 located on the surface of the base material layer are laminated. As to be described later, the surface protective layer 2 has an uneven shape, and more specifically both surfaces of the surface protective layer 2 have an uneven shape. Incidentally, in the uneven shape of the surface protective layer 2 of the present invention, the projection portion on the surface of the surface protective layer 2 is one formed so as to protrude in the direction on the surface protective layer 2 side of the decorative sheet and the recess portion is one formed so as to protrude in the direction on the base material layer 1 side of the decorative sheet.

As illustrated in FIG. 2, in the decorative sheet of the present invention, a decorative layer 3 may be provided between the base material layer 1 and the surface protective layer 2, if necessary, for the purpose of enhancing the design feeling due to appearance, and the like. In addition, a primer layer 4 may be provided so as to be in contact with a surface on the base material layer 1 side of the surface protective layer 2, if necessary, for the purpose of enhancing the adhesion between the surface protective layer 2 and the layer located below this, and the like.

In addition, a masking layer (not illustrated) may be provided between the base material layer 1 and the surface protective layer 2, if necessary, for the purpose of suppressing the change and variation in color of the base material layer 1. The masking layer may be provided between the base material layer 1 and the primer layer 4 in the case of providing the primer layer 4, and the masking layer may be provided between the base material layer 1 and the decorative layer 3 in the case of providing the decorative layer 3.

Furthermore, in the decorative sheet of the present invention, a back adhesive layer (not illustrated) may be provided on the back surface (the surface on the opposite side to the surface protective layer 2) of the base material layer 1, if necessary, for the purpose of enhancing the adhesion with the molded resin at the time of molding of a decorative resin molded article.

In the decorative sheet of the present invention, the uneven shape of the surface protective layer 2 located on the surface of the decorative sheet may be protected by an unevenness protective film (not illustrated) until the decorative sheet is laminated with a molded resin layer to form a decorative resin molded article. In the case of having an unevenness protective film, the outermost surface of the decorative sheet serves as the unevenness protective film.

Examples of the laminated structure of the decorative sheet of the present invention include a laminated structure in which base material layer 1/surface protective layer 2 are laminated; a laminated structure in which base material layer 1/decorative layer 3/surface protective layer 2 are laminated in order; a laminated structure in which base material layer 1/primer layer 4/surface protective layer 2 are laminated in order; a laminated structure in which base material layer 1/decorative layer 3/primer layer 4/surface protective layer 2 are laminated in order; and a laminated structure in which base material layer 1/decorative layer 3/primer layer 4/surface protective layer 2/unevenness protective film are laminated in order.

FIG. 1 illustrates a cross-sectional diagram of a decorative sheet in which base material layer 1/surface protective layer 2 are laminated as an aspect of laminated structures of the decorative sheet of the present invention. FIG. 2 illustrates a cross-sectional diagram of a decorative sheet in which base material layer 1/decorative layer 3/primer layer 4/surface protective layer 2 are laminated as an aspect of laminated structures of the decorative sheet of the present invention.
Composition of Respective Layers of Decorative Sheet
[Base Material Layer 1]

The base material layer 1 is a resin sheet (resin film) which plays a role as a support in the decorative sheet of the present invention. The resin component to be used in the base material layer 1 is not particularly limited and may be appropriately selected depending on the three-dimensional moldability, compatibility with the molded resin and the like, and a resin film formed of a thermoplastic resin is preferable. Specific examples of the thermoplastic resin include acrylonitrile-butadiene-styrene resin (hereinafter also referred to as "ABS resin" in some cases), acrylonitrile-styrene-acrylic acid ester resin (hereinafter also referred to as "ASA resin" in some cases), acrylic resins, polyolefin resins such as polypropylene and polyethylene, polycarbonate resins, vinyl chloride resins, and polyethylene terephthalate (PET). Among these, ABS resin and acrylic resins are preferable from the viewpoint of three-dimensional moldability. In addition, the base material layer 1 may be formed of a single layer sheet of these resins or a multilayer sheet of the same kind or different kinds of resins.

The bending elastic modulus of the base material layer 1 is not particularly limited. For example, in the case of integrating the decorative sheet of the present invention with a molded resin by an insert molding method, the bending elastic modulus of the base material layer 1 in the decorative sheet of the present invention at 25° C. is 500 to 4,000 MPa and preferably 750 to 3,000 MPa. Here, the bending elastic modulus at 25° C. is a value measured in conformity with JIS K7171. When the bending elastic modulus at 25° C. is 500 MPa or more, the decorative sheet exhibits sufficient rigidity and exhibits still more favorable surface properties and moldability even when being subjected to the insert molding method. In addition, when the bending elastic modulus at 25° C. is 4,000 MPa or less, sufficient tension can be applied in the case of producing the decorative sheet by roll-to-roll, sagging is less likely to occur, thus it is possible to repeatedly print a picture without shifting, and so-called picture registration is improved.

One surface or both surfaces of the base material layer 1 may be subjected to physical or chemical surface treatments by an oxidation method, a surface roughening method and the like, if necessary, in order to improve the adhesion with the layer to be provided thereon. Examples of the oxidation method to be performed as a surface treatment of the base material layer 1 include a corona discharge treatment, a chromium oxidation treatment, a flame treatment, a hot air treatment, and an ozone ultraviolet treatment method. In addition, examples of the surface roughening method to be performed as a surface treatment of the base material layer 1 include a sand blast method and a solvent treatment method. These surface treatments are appropriately selected depending on the kind of the resin component constituting the base material layer 1, but a corona discharge treatment method is preferable from the viewpoints of effects and operability.

In addition, the base material layer 1 may be subjected to a treatment for forming a known adhesive layer, and the like.

Furthermore, the base material layer 1 may be colored using a colorant or may not be colored. In addition, the base material layer 1 may be any of a colorless and transparent aspect, a colored and transparent aspect, or a translucent aspect. The colorant to be used in the base material layer 1 is not particularly limited and preferably includes a colorant which is not discolored even at a temperature condition of 150° C. or more, and specific examples thereof include existing dry color, paste color, masterbatch resin composition.

The thickness of the base material layer 1 is appropriately set depending on the applications of the decorative sheet, the molding method for integrating the decorative sheet with a molded resin, and the like, but is usually about 25 to 1000 µm and about 50 to 700 µm. More specifically, in the case of subjecting the decorative sheet of the present invention to the insert molding method, the thickness of the base material layer 1 is usually about 50 to 1000 µm, preferably about 100 to 700 µm, and more preferably about 100 to 500 µm. Moreover, in the case of subjecting the decorative sheet of the present invention to the injection molding simultaneous decorating method, the thickness of the base material layer 1 is usually about 25 to 200 µm, preferably about 50 to 200 µm, and more preferably about 70 to 200 µm. In addition, in the case of subjecting the decorative sheet of the present invention to the overlay method, the thickness of the base material layer 1 is usually about 50 to 350 µm and preferably about 100 to 300 µm. Incidentally, the thickness of the base material layer 1 is the thickness at the part at which a recess portion 2a of the surface protective layer 2 is located.

As illustrated in FIGS. 1 and 2, it is preferable that an uneven shape corresponding to the uneven shape formed on the surface protective layer 2 to be described later is formed on the surface on the surface protective layer 2 side of the base material layer 1. The design feeling due to appearance can be still further effectively enhanced by this.

[Surface Protective Layer 2]

The surface protective layer 2 is a layer to be provided in order to impart excellent design feeling due to appearance and excellent abrasion resistance and moldability to the decorative resin molded article by the uneven shape while protecting the surface of the decorative resin molded article. An uneven shape is formed on the surface of the surface protective layer 2. More specifically, uneven shapes are formed on both surfaces of the surface protective layer 2. Hence, an uneven shape corresponding to the uneven shape is also formed on the surface of the layers (for example, the base material layer 1 and the primer layer 4, decorative layer 3 and the like to be provided if necessary) in contact with the base material layer 1 side of the surface protective layer 2. Hereinafter, the uneven shape provided on the surface protective layer 2 will be described in detail.

<Uneven Shape>

As described above, the surface protective layer 2 of the decorative sheet of the present invention has a cross section in the thickness direction, and the cross section has an uneven shape in which a pattern including a projection portion and a recess portion adjacent to each other is repeated on the surface side. In other words, the surface protective layer 2 has an uneven cross-sectional structure on the surface side, and the uneven shape is one in which a pattern including a projection portion and a recess portion adjacent to each other is repeated. In other words, the decorative sheet of the present invention has an uneven shape having a plurality of recess portions and projection portions continuous in one direction on the surface of the surface protective layer 2. In the uneven shape, the relation of 0.10 average value of $T_p$/average value of $T_v$ 0.35 is satisfied in the case of measuring the ratio (average value of $T_p$/average value of $T_v$) of the average value (μm) of thicknesses $T_p$ of the surface protective layer at the projection portions to the average value (μm) of thicknesses $T_v$ of the surface protective layer at the recess portions. The decorative sheet has such a configuration and thus can exhibit excellent design feeling due to appearance having stereoscopic feeling and further exhibits excellent abrasion resistance and moldability. Furthermore, the surface protective layer 2 of the decorative resin molded article after molding suitably satisfies the relation of 0.20 average value of $T_p$/average value of $T_v$ 0.45, thus excellent design feeling due to appearance having stereoscopic feeling can be imparted to the decorative resin molded article and excellent abrasion resistance can also be imparted to the decorative resin molded article. This mechanism can be considered as follows. In other words, as the average value of the thicknesses $T_v$ of the surface protective layer 2 at the recess portions 2a of the decorative sheet and the average value of the thicknesses $T_p$ of the surface protective layer 2 at projection portions 2b are in a relation of average value of $T_p$/average value of $T_v$ 0.35, a difference in gloss caused by a difference in the thickness of the layer is generated between the recess portion 2a and the projection portion 2b of the surface protective layer 2 and it looks having stereoscopic feeling more than the actual height difference of the uneven shape. In addition, as the thicknesses $T_v$ at the recess portions 2a and the thicknesses $T_p$ at the projection portions 2b are in the relation of 0.10 average value of $T_p$/average value of $T_v$, it is suppressed that the thicknesses $T_v$ of the surface protective layer 2 at the recess portions 2a is excessive and the surface protective layer is cracked when a molding process accompanied by stretching is performed or the thicknesses $T_p$ of the surface protective layer 2 at the projection portions 2b are insufficient and the abrasion resistance is diminished. Incidentally, generally the gloss increases as the thickness of the layer increases, thus as the relation of average value of $T_p$/average value of $T_v$ 0.35 is satisfied, that is, the thickness of the surface protective layer 2 at the recess portion 2a is thicker than that of the surface protective layer 2 at the projection portion 2b, it is considered that the recess portion 2a looks relatively more glossy and the projection portion 2b looks relatively less glossy, but, for example, it is conceivable that the gloss decreases as the thickness of the layer increases in a case in which the surface protective layer 2 contains a matting agent, and the recess portion 2a can look relatively less glossy and the projection portion 2b can look relatively more glossy in this case. Moreover, as a decorative sheet satisfying the relation of 0.10 average value of $T_p$/average value of $T_v$ 0.35 is subjected to molding, the surface protective layer 2 of the decorative sheet is stretched, the average value (μm) of the thicknesses $T_v$ of the surface protective layer at the recess portions and the average value (μm) of the thicknesses $T_p$ of the surface protective layer at the projection portions change, and a decorative resin molded article in which the uneven shape of the surface protective layer satisfies the relation of 0.20 average value of $T_p$/average value of $T_v$ 0.45 is suitably formed. In other words, as the uneven shape of the surface protective layer of the decorative resin molded article satisfies the relation of average value of $T_p$/average value of $T_v$ 0.45, a difference in gloss caused by a difference in thickness is generated between the recess portion 2a and the projection portion 2b of the surface protective layer 2 and it looks having stereoscopic feeling more than the actual height difference of the uneven shape. In addition, as the uneven shape satisfies the relation of 0.20 average value of $T_p$/average value of $T_v$, it is considered that it is suitably suppressed that the thicknesses $T_p$ of the surface protective layer 2 at the projection portions 2b are insufficient and the abrasion resistance is diminished.

When calculating the average value of the thicknesses $T_v$ at the recess portions and the average value of the thicknesses $T_p$ at the projection portions, the number of thicknesses $T_v$ measured at the recess portions and the number of thicknesses $T_p$ measured at the projection portions may be 2 or more, respectively, but is preferably 3 or more, respectively and more preferably 5 or more, respectively, from the viewpoint of still further improving the design feeling due to appearance and the abrasion resistance and moldability and improving the design feeling and abrasion resistance of the decorative resin molded article. Incidentally, it is sufficient that the number of thicknesses $T_v$ measured and the number of thicknesses $T_p$ measured are 10 or less, respectively.

With reference to the schematic diagram illustrated in FIG. 1, the uneven shape in which a pattern including a projection portion and a recess portion adjacent to each other is repeated on the surface side in the cross section in the thickness direction of the surface protective layer 2 will be specifically described by taking a case in which the number of thicknesses $T_v$ measured and the number of thicknesses $T_p$ measured are 3, respectively as an example. FIG. 1 illustrates the thicknesses $T_{v1}$, $T_{v2}$, and $T_{v3}$ of the surface protective layer 2 at three recess portions 2a1, 2a, and 2a3 and the thicknesses $T_{p1}$, $T_{p2}$, and $T_{p3}$ of the surface protective layer 2 at three projection portions 2b1, 2b2, and 2b3. As the recess portion 2a1 and the projection portion 2b1 are adjacent to each other, the recess portion 2a2 and the projection portion 2b2 are adjacent to each other, and the recess portion 2a3 and the projection portion 2b3 are adjacent to each other, and a pattern including these projection portions and recess portions is repeated, an uneven shape is formed. In other words, as the recess portion 2a1, the projection portion 2b1 the recess portion 2a, the projection portion 2b2, the recess portion 2a3, and the projection portion 2b3 are present in order in one direction, an uneven shape is formed in one direction on the surface of the surface protective layer 2. The average value (μm) of the thicknesses $T_v$ of the surface protective layer 2 at the three recess portions can be determined by dividing the sum of the thicknesses $T_{v1}$, $T_{v2}$, and $T_{v3}$ by 3 (namely, $(T_{v1}+T_{v2}+T_{v3})/3$), and the average value (μm) of the thicknesses $T_p$ of the surface protective layer 2 at the three projection portions can be determined by dividing the sum of the thicknesses $T_{p1}$, $T_{p2}$, and $T_{p3}$ by 3 (namely, $(T_{p1}+T_{p2}+T_{p3})/3$).

Incidentally, the thickness $T_p$ at the projection portion 2b and the thickness $T_v$ at the recess portion 2a of the surface protective layer 2 are values measured by observing a cross section in the thickness direction of the decorative sheet under a scanning electron microscope (SEM).

The average value (μm) of the thicknesses $T_p$ at the projection portions 2b of the surface protective layer 2 to be the target of measurement is not particularly limited as long as the relation of average value of $T_p$/average value of $T_v$ is satisfied but is preferably 3 μm or more, more preferably about 3 to 10 μm, and still more preferably about 5 to 8 μm from the viewpoint of still further improving the design feeling due to appearance and the abrasion resistance and moldability and improving the design feeling and abrasion resistance of the decorative resin molded article.

In addition, the average value (μm) of the thicknesses $T_v$ at the recess portions 2a of the surface protective layer 2 to be the target of measurement is not particularly limited as long as the relation of average value of $T_p$/average value of $T_v$ is satisfied but is preferably 30 μm or less, more preferably about 10 to 26 μm, and still more preferably about 15 to 20 μm from the viewpoint of still further improving the design feeling due to appearance and the abrasion resistance and moldability and improving the design feeling and abrasion resistance of the decorative resin molded article.

In addition, the average of distances w (distance in the direction perpendicular to the thickness direction of the decorative sheet) between the recess portions 2a of the surface protective layer 2 to be the target of measurement and the projection portions 2b adjacent to the recess portions 2a is not particularly limited but is preferably about 10 to 300 μm, more preferably about 50 to 250 μm, and still more preferably about 100 to 200 μm from the viewpoint of still further improving the design feeling due to appearance and the abrasion resistance and moldability and improving the design feeling and abrasion resistance of the decorative resin molded article. Incidentally, the distance w is a value measured from a cross section in the thickness direction of the decorative sheet as illustrated in FIGS. 1 and 2.

The design expressed on the surface of the decorative sheet by the uneven shape of the surface protective layer 2 is not particularly limited. Examples of the design expressed by the uneven shape include a hairline picture, a wood grain picture, and a geometric picture (dot, stripe, woven fabric, carbon and the like).

The material constituting the surface protective layer 2 is not particularly limited, and examples thereof include thermoplastic resins, thermosetting resins, and ionizing radiation curable resins. Among these, the surface protective layer 2 is preferably composed of a cured product of an ionizing radiation curable resin composition from the viewpoint of improving abrasion resistance. The ionizing radiation curable resin to be used in the formation of the surface protective layer 2 will be described in detail below.

(Ionizing Radiation Curable Resin)

The ionizing radiation curable resin to be used in the formation of the surface protective layer 2 is a resin which is crosslinked and cured when being irradiated with ionizing radiation, and specific examples thereof include those in which at least one of prepolymers, oligomers, and monomers having a polymerizable unsaturated bond or an epoxy group in the molecule is appropriately mixed. Here, the ionizing radiation means an electromagnetic wave or a charged particle beam having an energy quantum capable of polymerizing or crosslinking a molecule, and usually ultraviolet rays (UV) or electron beams (EB) are used, but the ionizing radiation also includes electromagnetic waves such as X-rays and γ rays and charged particle beams such as α rays and ion rays in addition to these. Among ionizing radiation curable resins, electron beam curable resins can be prepared as solvent-free resins, do not require an initiator for photopolymerization, exhibit stable curing properties, and thus are suitably used in the formation of the surface protective layer 2.

As the monomers to be used as the ionizing radiation curable resin, (meth)acrylate monomers having a radically polymerizable unsaturated group in the molecule are suitable, and among these, polyfunctional (meth)acrylate monomers are preferable. The polyfunctional (meth)acrylate monomer may be a (meth)acrylate monomer having 2 or more (bifunctional or higher), preferably 3 or more (trifunctional or higher) polymerizable unsaturated bonds in the molecule. Specific examples of the polyfunctional (meth)acrylate include ethylene glycol di(meth)acrylate, propylene glycol di(meth)acrylate, 1,4-butanediol di(meth)acrylate, and 1,6-hexanediol di(meth)acrylate, neopentyl glycol di(meth)acrylate, polyethylene glycol di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphate di(meth)acrylate, allylated cyclohexyl di(meth)acrylate, isocyanurate di(meth)acrylate, trimethylolpropane tri(meth)acrylate, ethylene oxide-modified trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl) isocyanurate, propionic acid-modified dipentaerythritol penta(meth)acrylate, dipentaerythritol hexa(meth)acrylate, ethylene oxide-modified dipentaerythritol hexa(meth)acrylate, and caprolactone-modified dipentaerythritol hexa(meth)acrylate. These monomers may be used singly or in combination of two or more kinds thereof.

In addition, as the oligomers to be used as the ionizing radiation curable resin, (meth)acrylate oligomers having a radically polymerizable unsaturated group in the molecule are suitable, and among these, polyfunctional (meth)acrylate oligomers having two or more (bifunctional or higher) polymerizable unsaturated bonds in the molecule are preferable. Examples of the polyfunctional (meth)acrylate oligomer include polycarbonate (meth)acrylate, acrylic silicone (meth)acrylate, urethane (meth)acrylate, epoxy (meth)acrylate, polyester (meth)acrylate, polyether (meth)acrylate, polybutadiene (meth)acrylate, silicone (meth)acrylate, and oligomers having a cationically polymerizable functional group in the molecule (for example, novolac epoxy resins, bisphenol epoxy resins, aliphatic vinyl ether, and aromatic vinyl ether). Here, the polycarbonate (meth)acrylate is not particularly limited as long as it has a carbonate bond in the polymer main chain and a (meth)acrylate group at the terminal or in the side chain and can be obtained by, for example, esterifying a polycarbonate polyol with (meth) acrylic acid. The polycarbonate (meth)acrylate may be, for example, urethane (meth)acrylate having a polycarbonate skeleton. The urethane (meth)acrylate having a polycarbonate skeleton can be obtained by, for example, reacting a polycarbonate polyol with a polyvalent isocyanate compound and hydroxy (meth)acrylate. Acrylic silicone (meth) acrylate can be obtained by radically copolymerizing a silicone macromonomer with a (meth)acrylate monomer. Urethane (meth)acrylate can be obtained by, for example, esterifying a polyurethane oligomer obtained by reaction of polyether polyol or polyester polyol with a polyisocyanate compound with (meth)acrylic acid. The epoxy (meth)acrylate can be obtained by, for example, reacting (meth)acrylic acid with an oxirane ring of a bisphenol epoxy resin or novolac epoxy resin having a relatively low molecular weight for esterification. In addition, a carboxyl-modified epoxy (meth)acrylate obtained by partially modifying this epoxy (meth)acrylate with a dibasic carboxylic anhydride can also be used. The polyester (meth)acrylate can be obtained by, for example, esterifying the hydroxyl group of a polyester oligomer which has a hydroxyl group at both terminals and is obtained by condensation of a polycarboxylic acid and a polyhydric alcohol with (meth)acrylic acid or esterifying the hydroxyl group at the terminal of an oligomer obtained by adding an alkylene oxide to a polycarboxylic acid with (meth)acrylic acid. The polyether (meth)acrylate can be obtained by esterifying the hydroxyl group of the polyether polyol with (meth)acrylic acid. Polybutadiene (meth)acrylate can be obtained by adding (meth)acrylic acid to the side chain of polybutadiene oligomer. Silicone (meth) acrylate can be obtained by adding (meth)acrylic acid to the terminal or side chain of silicone having a polysiloxane bond in the main chain. These oligomers may be used singly or in combination of two or more kinds thereof.

Among the ionizing radiation curable resins described above, it is preferable to use polycarbonate (meth)acrylate from the viewpoint of attaining superior three-dimensional moldability while still further improving the design feeling due to appearance and the abrasion resistance and moldability. It is also preferable to use polycarbonate (meth)acrylate and urethane (meth)acrylate in combination.

(Other Additive Components)

Various additives can be blended in the surface protective layer 2 depending on the desired physical properties to be imparted to the surface protective layer 2. Examples of these additives include a weather resistance improver such as an ultraviolet absorber or a light stabilizer, an abrasion resistance improver, a polymerization inhibitor, a crosslinking agent, an infrared absorber, an antistatic agent, an adhesion improver, a leveling agent, a thixotropic agent, a coupling agent, a plasticizer, an antifoaming agent, a filler, a solvent, and a colorant. These additives can be appropriately selected from those commonly used and used. In addition, as the ultraviolet absorber or light stabilizer, a reactive ultraviolet absorber or light stabilizer having a polymerizable group such as a (meth)acryloyl group in the molecule can be used.

(Formation of Surface Protective Layer 2)

The surface protective layer 2 is formed by, for example, preparing an ionizing radiation curable resin composition containing an ionizing radiation curable resin, applying, crosslinking, and curing the composition. Incidentally, the viscosity of the ionizing radiation curable resin composition may be a viscosity at which an uncured resin layer can be formed by the coating technique to be described. As to be described later, in the present invention, the surface protective layer 2 can be suitably produced by applying a resin constituting the surface protective layer 2 on the surface on the base material layer side on which the uneven shape is formed and curing the resin. At this time, the "average value of $T_p$/average value of $T_v$" of the surface protective layer 2 can be adjusted to be in the above range by adjusting the viscosity of the resin according to the uneven shape. For example, in a case in which the resin viscosity is low, the resin is likely to accumulate in the recess portion and the resin is less likely to remain in the projection portion when the resin constituting the surface protective layer 2 is applied on the surface on the base material layer side on which the uneven shape is formed. As a result, there is a tendency that the thickness of the recess portion increases and the thickness of the projection portion decreases. Conversely, in a case in which the resin viscosity is high, the resin is likely to remain in the projection portion when the resin constituting the surface protective layer 2 is applied on the surface on the base material layer side on which the uneven shape is formed. As a result, there is a tendency that the thickness of the recess portion decreases and the thickness of the projection portion increases.

In the present invention, the prepared resin is applied by known methods such as gravure coating, bar coating, roll coating, reverse roll coating, and comma coating, preferably gravure coating to form an uncured resin layer so that the "average value of $T_p$/average value of $T_v$" of the surface protective layer is in the above range.

The uncured resin layer thus formed is irradiated with ionizing radiation such as electron beams and ultraviolet rays to cure the uncured resin layer, whereby the surface protective layer 2 is formed. Here, in the case of using an electron beam as ionizing radiation, the accelerating voltage can be appropriately selected depending on the resin used and the thickness of the layer, and the accelerating voltage is usually about 70 to 300 kV.

Incidentally, in the irradiation with electron beam, the transmission capability increases as the accelerating voltage is higher, and thus the accelerating voltage is selected so that the penetration depth of electron beam and the thickness of the surface protective layer 2 are substantially equal to each other in the case of using a resin which is likely to deteriorate by being irradiated with an electron beam below the surface protective layer 2. By this, it is possible to suppress irradiation of a layer located below the surface protective layer 2 with an extra electron beam and to minimize deterioration of each layer due to the excess electron beam.

In addition, the irradiation dose is preferably a dose in which the crosslinking density of the surface protective layer 2 is saturated, and is selected usually in a range of 5 to 300 kGy (0.5 to 30 Mrad) and preferably in a range of 10 to 50 kGy (1 to 5 Mrad).

Furthermore, the electron beam source is not particularly limited, and, for example, various electron beam accelerators such as Cockloft Walton type, Van de Graaff type, resonant transformer type, insulated core transformer type, linear type, dynamitron type, and high frequency type can be used.

In the case of using ultraviolet rays as the ionizing radiation, light including ultraviolet rays having a wavelength of 190 to 380 nm may be radiated. The ultraviolet ray source is not particularly limited, and examples thereof include a high pressure mercury lamp, a low pressure mercury lamp, a metal halide lamp, and a carbon arc lamp.

The surface protective layer 2 thus formed may be subjected to a treatment for imparting functions such as a hard-coat function, an anti-fog coating function, an antifouling coating function, an anti-glare coating function, an antireflection coating function, an ultraviolet shielding coating function, and an infrared shielding coating function by adding various additives thereto.

[Decorative Layer 3]

The decorative layer 3 is a layer to be provided between the base material layer 1 and the surface protective layer 2, between the base material layer 1 and the primer layer 4 in the case of providing the primer layer 4, or between the masking layer and the surface protective layer 2 in the case of providing a masking layer, if necessary, for the purpose of imparting decorativeness to the decorative sheet. The decorative layer 3 is preferably provided along the uneven shape of the surface protective layer 2 from the viewpoint of enhancing the design feeling of appearance.

The decorative layer 3 can be, for example, a layer in which a desired picture is formed using an ink composition. As the ink composition to be used in the formation of the decorative layer 3, one in which a binder is appropriately mixed with a colorant such as a pigment or a dye, an extender pigment, a solvent, a stabilizer, a plasticizer, a catalyst, a curing agent and the like is used.

The binder to be used in the ink composition is not particularly limited, but examples thereof include a polyurethane resin, a vinyl chloride/vinyl acetate copolymer resin, a vinyl chloride/vinyl acetate/acrylic copolymer resin, a chlorinated polypropylene resin, an acrylic resin, a polyester resin, a polyamide resin, a butyral resin, a polystyrene resin, a nitrocellulose resin, and a cellulose acetate resin. These binders may be used singly or in combination of two or more kinds thereof.

The colorant to be used in the ink composition is not particularly limited, but examples thereof include inorganic pigments such as carbon black (black), iron black, titanium white, antimony white, yellow lead, titanium yellow, petals, cadmium red, ultramarine, and cobalt blue; organic pigments or dyes such as quinacridone red, isoindolinone yellow, and phthalocyanine blue; metal pigments formed of scaly foil pieces such as aluminum and brass; and pearlescent pigments formed of scaly foil pieces such as titanium dioxide-covered mica and basic lead carbonate.

The picture to be formed by the decorative layer 3 is not particularly limited, but examples thereof include a wood grain picture, a rock grain picture imitating the surface of a rock such as, marble picture (for example, travertine marble picture), a fabric picture imitating a cloth or cloth-like picture, a tiled picture, and a brickwork picture, and the picture may be a picture such as a parquet or patchwork, which is any combination of these or a plain single color (so-called solid surface). These pictures are formed by multicolor printing using normal yellow, red, blue, and black process colors but can also be formed by multicolor printing by special colors performed by preparing individual color plates constituting the picture, and the like.

The thickness of the decorative layer 3 is not particularly limited and, for example, is 1 to 30 μm and preferably 1 to 20 μm. Incidentally, the thickness of the decorative layer 3 is the thickness at the part at which the recess portion 2a of the surface protective layer 2 is located.

In addition, the decorative layer 3 may be a thin metal film layer. Examples of the metal forming the thin metal film layer include tin, indium, chromium, aluminum, nickel, copper, silver, gold, platinum, zinc, and alloys containing at least one of these. The method for forming the thin metal film layer is not particularly limited, and examples thereof include a vapor deposition method such as a vacuum vapor deposition method, a sputtering method, and an ion plating method using the above-described metals. The thin metal film layer may be provided on the entire surface or may be partially provided.

In a case in which the decorative layer 3 is a thin metal film layer, the thickness thereof is not particularly limited, but the optical density (OD value) is preferably about 0.6 to 1.8 and more preferably about 0.8 to 1.4 from the viewpoint of enhancing the design property of the decorative sheet. Incidentally, the thickness (OD value) of the thin metal film layer is the thickness at the part at which the recess portion 2a of the surface protective layer 2 is located.

[Primer Layer 4]

In addition, the primer layer 4 is a layer to be provided so as to be in contact with the surface on the base material layer 1 side of the surface protective layer 2, if necessary, for the purpose of enhancing the adhesion between the surface protective layer 2 and the layer located below this, and the like. The primer layer 4 is provided along the uneven shape of the surface protective layer 2.

As the primer composition constituting the primer layer 4, those containing a urethane resin, a (meth)acrylic resin, a (meth)acrylic-urethane copolymer resin, a vinyl chloride-vinyl acetate copolymer, a polyester resin, a butyral resin, chlorinated polypropylene, chlorinated polyethylene and the like are preferably used as a binder resin, and these resins can be used singly or in combination of two or more kinds thereof. Among these, a urethane resin, a (meth)acrylic resin, and a (meth)acrylic-urethane copolymer resin are preferable.

As the urethane resin, polyurethane having a polyol (polyhydric alcohol) as a main agent and an isocyanate as a crosslinking agent (curing agent) can be used. As the polyol, those having two or more hydroxyl groups in the molecule, for example, polyester polyol, polyethylene glycol, polypropylene glycol, acrylic polyol, and polyether polyol are used. As the isocyanate, polyvalent isocyanates having two or more isocyanate groups in the molecule, aromatic isocyanates such as 4,4-diphenylmethane diisocyanate, or aliphatic (or alicyclic) isocyanates such as hexamethylene diisocyanate, isophorone diisocyanate, hydrogenated tolylene diisocyanate, hydrogenated diphenylmethane diisocyanate are used. In addition, a configuration in which urethane resin and butyral resin are mixed together is also possible.

From the perspective of adhesion with the surface protective layer 2 after crosslinking, difficulty of interaction after lamination of the surface protective layer 2, physical properties, and moldability, it is preferable to combine acrylic polyol or polyester polyol as a polyol with hexamethylene diisocyanate and 4,4-diphenylmethane diisocyanate as a crosslinking agent, it is particularly preferable to use a combination of acrylic polyol with hexamethylene diisocyanate.

Examples of (meth)acrylic resins include (meth)acrylic acid ester homopolymers, copolymers of two or more different (meth)acrylic acid ester monomers, or copolymers of (meth)acrylic acid esters and other monomers. Specifically, (meth)acrylic resins composed of homopolymers or copolymers containing a (meth)acrylic acid ester such as polymethyl (meth)acrylate, polyethyl (meth)acrylate, polypropyl (meth)acrylate, polybutyl (meth)acrylate, methyl (meth)acrylate-butyl (meth)acrylate copolymer, ethyl (meth)crylate-butyl (meth)acrylate copolymer, ethylene-methyl (meth)acrylate copolymer, styrene-methyl (meth)acrylate copolymer are suitably used.

As the (meth)acrylic-urethane copolymer resin, for example, an acrylic-urethane (polyester urethane) block copolymer-based resin is preferable. As the curing agent, the above-mentioned various isocyanates are used. In the acrylic-urethane (polyester urethane) block copolymer-based resin, it is preferable to adjust an acrylic/urethane ratio (mass ratio) to preferably 9/1 to 1/9 and more preferably to 8/2 to 2/8, if desired.

The thickness of the primer layer 4 is not particularly limited and, for example, is 0.5 to 20 μm and preferably 1 to 5 μm. Incidentally, the thickness of the primer layer 4 is the thickness at the part at which the recess portion 2*a* of the surface protective layer 2 is located.

The primer layer 4 is formed using a primer composition by a normal coating method or transfer coating method such as gravure coating, gravure reverse coating, gravure offset coating, spinner coating, roll coating, reverse roll coating, kiss coating, wheeler coating, dip coating, solid coating with silk screen, wire bar coating, flow coating, comma coating, pouring coating, brush coating, and spray coating. Here, the transfer coating method is a method in which coating films of primer layer and adhesive layer are formed on a thin sheet (film base material) and then covered on the target layer surface in the decorative sheet.

[Masking Layer]

The masking layer is a layer to be provided between the base material layer 1 and the surface protective layer 2, between the base material layer 1 and the primer layer 4 in the case of providing the primer layer 4, or between the base material layer 1 and the decorative layer 3 in the case of providing the decorative layer 3, if necessary, for the purpose of suppressing the change and variation in color of the base material layer 1.

The masking layer is provided in order to suppress that the base material layer adversely affects the color tone and picture of the decorative sheet and thus is generally formed as an opaque layer.

The masking layer is formed using an ink composition in which a binder is appropriately mixed with a colorant such as a pigment or a dye, an extender pigment, a solvent, a stabilizer, a plasticizer, a catalyst, a curing agent and the like. The ink composition for forming the masking layer is appropriately selected from those to be used in the decorative layer described above and used.

It is desirable that the masking layer is formed as a so-called solid printing layer and the thickness thereof is usually set to about 1 to 20 μm. Incidentally, the thickness of the masking layer is the thickness at the part at which the recess portion 2*a* of the surface protective layer 2 is located.

The masking layer is formed by normal printing methods such as gravure printing, offset printing, silk screen printing, printing by transfer from a transfer sheet, and inkjet printing; normal coating methods such as gravure coating, gravure reverse coating, gravure offset coating, spinner coating, roll coating, and reverse roll coating; and the like.

[Back Adhesive Layer]

The back adhesive layer (not illustrated) is a layer to be provided on the back surface (surface on the opposite side to the surface protective layer 2) of the base material layer 1, if necessary, for the purpose of enhancing the adhesion with the molded resin when molding a decorative resin molded article.

A thermoplastic resin or a curable resin is used in the back adhesive layer depending on the molded resin to be used in the decorative resin molded article.

Examples of the thermoplastic resin to be used in the formation of the back adhesive layer include an acrylic resin, an acrylic-modified polyolefin resin, a chlorinated polyolefin resin, a vinyl chloride/vinyl acetate copolymer, a thermoplastic urethane resin, a thermoplastic polyester resin, a polyamide resin, and a rubber-based resin. These thermoplastic resins may be used singly or in combination of two or more kinds thereof.

In addition, examples of the thermosetting resin to be used in the formation of the back adhesive layer include urethane resin and epoxy resin. These thermosetting resins may be used singly or in combination of two or more kinds thereof.

[Unevenness Protective Film Layer]

In the present invention, the uneven shape of the surface protective layer 2 may be protected by an unevenness protective film layer. The unevenness protective film layer is a layer to be provided to suppress deformation and disappearance of the uneven shape of the surface protective layer 2 at the time of vacuum molding or injection molding of the decorative sheet. The unevenness protective film layer is provided on the surface on the opposite side to the base material layer 1 side of the surface protective layer 2. The unevenness protective film layer covers the uneven shape of the surface protective layer 2. The unevenness protective film layer is laminated in a state of being peelable from the decorative sheet (surface protective layer 2) and is a layer to be peeled off from the decorative resin molded article after being integrally molded with the molded resin.

The unevenness protective film layer and the surface protective layer 2 may be directly laminated, or other layers may be laminated between these layers. In a case in which the unevenness protective film layer and the surface protective layer 2 are directly laminated, the unevenness protective film layer serves as an unevenness protective layer for protecting the uneven shape of the surface protective layer 2.

In a case in which the unevenness protective film layer and the surface protective layer 2 are directly laminated, it is preferable that the unevenness protective film layer fills at least a part of the recess portion of the uneven shape of the surface protective layer 2. As the unevenness protective film layer fills the recess portion of the uneven shape of the surface protective layer 2, the protective function of the uneven shape of the surface protective layer 2 by the unevenness protective film layer can be further enhanced.

Examples of the method for filling the recess portion of the uneven shape of the surface protective layer 2 with the unevenness protective film layer include a method in which the unevenness protective film layer is laminated so as to fill the recess portion of the uneven shape of the surface protective layer 2 by extrusion molding or heat lamination.

The resin constituting the unevenness protective film layer is not particularly limited, and examples thereof include thermoplastic resins such as an acrylonitrile-butadiene-styrene resin (hereinafter also referred to as "ABS resin" in some cases), an acrylonitrile-styrene-acrylic acid ester resin, an acrylic resins, polyolefin-based resins such as polypropylene and polyethylene, a polycarbonate resin, a vinyl chloride-based resin; and polyester resins such as a polyethylene terephthalate (PET) resin and a polybutylene terephthalate (PBT) resin. One kind of thermoplastic resin may be contained singly, or two or more kinds thereof may be contained.

The thickness of the unevenness protective film layer is not particularly limited but is preferably about 5 to 300 μm and more preferably about 5 to 100 μm.

(Release Layer)

The release layer is a layer to be provided, if necessary, for the purpose of enhancing the separability between the unevenness protective film layer and the surface protective layer 2. The release layer is also provided so as to be in contact with the surface protective layer 2. In the present invention, in a case in which the release layer is laminated, the release layer fills the recess portion of the uneven shape of the surface protective layer 2.

The material for forming the release layer is not particularly limited as long as it can be applied so as to fill the uneven shape of the surface protective layer 2 and can be peeled off from the surface of the surface protective layer 2 together with the unevenness protective film layer, but the release layer is preferably formed of a cured product of an ionizing radiation curable resin composition. By this, it is possible to still further effectively suppress the deformation and disappearance of the uneven shape of the surface protective layer 2 at the time of vacuum molding and injection molding and to impart excellent design feeling and the like to the decorative resin molded article.

Method for Producing Decorative Sheet

The decorative sheet of the present invention can be produced by, for example, a method including the following steps.

Step 1 of forming uneven shape on one side of base material layer 1

Step 2 of forming surface protective layer 2 on surface side on which uneven shape is formed of base material layer 1

When the method for producing a decorative sheet is described by taking, for example, a case in which the decorative sheet of the present invention includes only the base material layer 1 and the surface protective layer 2 as an example, an uneven shape is first formed on the surface on one side of the base material layer in step 1. Next, the surface protective layer 2 is formed on the surface side on which the uneven shape is formed of the base material layer 1 in step 2, whereby the decorative sheet of the present invention can be produced.

In step 2, specifically, a resin constituting the surface protective layer 2 is applied on the surface on the base material layer 1 side on which the uneven shape is formed and the thicknesses of the projection portions 2b and the recess portions 2a of the surface protective layer are adjusted so as to satisfy the above-described relation of 0.10 $T_p/T_v$ 0.35, whereby the surface protective layer 2 is formed. For example, in a case in which the resin viscosity is low, the resin is likely to accumulate in the recess portion and the resin is less likely to remain in the projection portion when the resin constituting the surface protective layer 2 is applied on the surface on the base material layer side on which the uneven shape is formed as described above. As a result, there is a tendency that the thickness of the recess portion increases and the thickness of the projection portion decreases. Conversely, in a case in which the resin viscosity is high, the resin is likely to remain in the projection portion when the resin constituting the surface protective layer 2 is applied on the surface on the base material layer side on which the uneven shape is formed. As a result, there is a tendency that the thickness of the recess portion decreases and the thickness of the projection portion increases. By taking advantage of such properties of resin, the resin viscosity is adjusted depending on the height of the projection portion of the uneven shape, the distance between the recess portion and the projection portion, and the like so as to satisfy the above-described relation of 0.10 $T_p/T_v$ 0.35.

In step 1, the method for forming the uneven shape on one side of the base material layer 1 is not particularly limited, and for example, embossing can be suitably employed. Embossing is a known method and is a method in which the surface of the embossing target is softened by heating and then pressurized using an embossing plate, the uneven shape formed on the embossing plate is shaped on the surface of the embossing target, cooled, and fixed. For embossing, a known single-wafer or rotary embossing machine can be used. The uneven shape of the surface protective layer 2 can be formed by using an embossing plate corresponding to the uneven shape to be formed on the surface protective layer 2.

In addition, it is possible to adjust the thicknesses of the projection portions 2b and the recess portions 2a of the surface protective layer 2 to be formed in step 2 and to satisfy the relation of 0.10 (average value of $T_p$/average value of $T_v$) 0.35 by adjusting the uneven shape to be formed on the base material layer 1 in step 1 as well. The resin applied in step 2 is likely to flow into the recess portions, for example, by steepening the slope of the projection portions and recess portions formed on the base material layer 1 or by increasing the height difference, and it is thus possible to increase the thicknesses $T_v$ at the recess portions 2a of the surface protective layer 2 and to decrease the thicknesses $T_p$ of the projection portions 2b. It is possible to satisfy the above-described relation of 0.10 (average value of $T_p$/average value of $T_v$) 0.35 by appropriately adjusting the uneven shape to be formed on the base material layer 1 in step 1 and the viscosity of the resin for forming the surface protective layer 2 in step 2 in this manner.

In the method for producing the decorative sheet of the present invention, details of the base material layer 1, the surface protective layer 2, and the decorative layer 3 and primer layer 4 to be provided if necessary are as described above.

In step 1, before providing the uneven shape on the surface of the base material layer 1, the above-described decorative layer 3, primer layer 4 and the like may be laminated if necessary and then the uneven shape may be formed on the primer layer 4 or the decorative layer 3. In the case of laminating the decorative layer 3, the primer layer 4 and the like, it is possible to form an uneven shape on the surface of the base material layer 1 and to suitably form the decorative layer 3 and the primer layer 4 along the uneven shape of the surface protective layer 2 to be formed thereafter by subjecting the side on which these layers are laminated to embossing.

In addition, in step 1, before laminating the above-described decorative layer 3, primer layer 4 and the like, the uneven shape may be provided on the surface of the base material layer 1 and then the above-described decorative layer 3, primer layer 4 and the like may be laminated. In this case as well, it is possible to form the uneven shape on the surface of the base material layer 1 and to form the decorative layer 3 and the primer layer 4 along the uneven shape by laminating the decorative layer 3 and the primer layer 4 so that the recess portions 2a of the uneven shape are not completely filled.

2. Decorative Resin Molded Article

Figure 3:
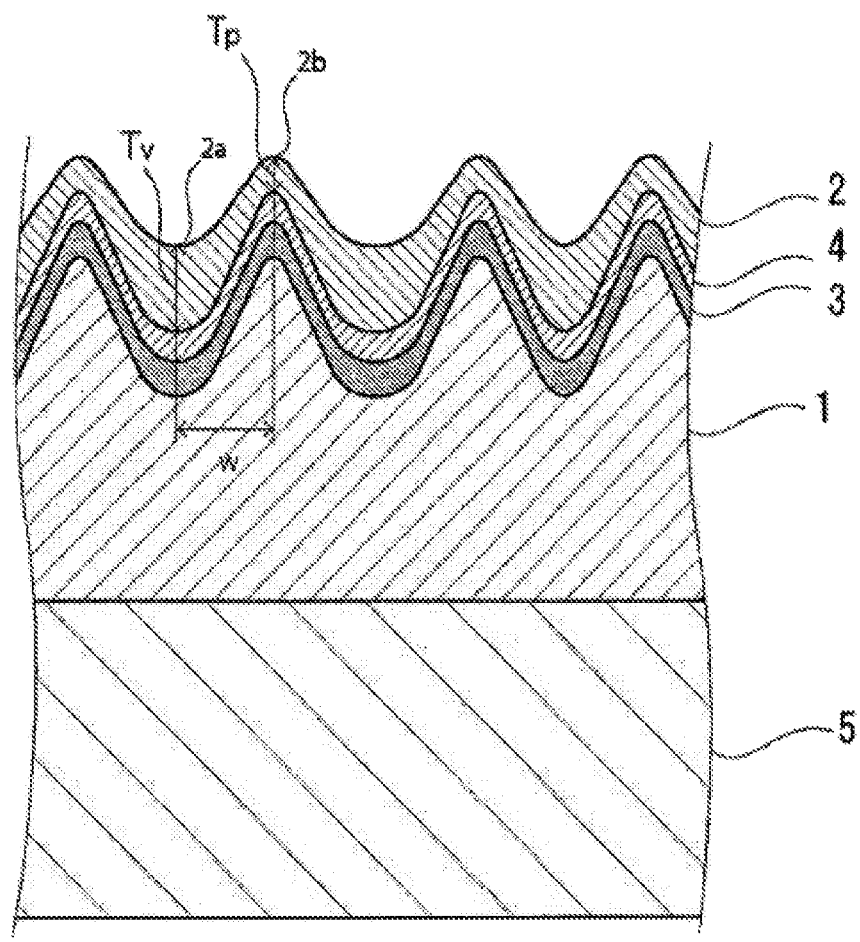
FIG. 3 is a schematic diagram of a cross-sectional structure of an embodiment of a decorative resin molded article of the present invention.

The decorative resin molded article of the present invention is molded by integrating a molded resin with the decorative sheet of the present invention. In other words, the decorative resin molded article of the present invention is a decorative resin molded article which include at least a molded resin layer, a base material layer, and a surface protective layer located on the surface and in which the surface protective layer has a cross section in a thickness direction, the cross section has an uneven shape in which a pattern including a projection portion and a recess portion adjacent to each other is repeated on the surface side, and a relation of 0.20 average value of $T_p$/average value of $T_v$ 0.45 is satisfied in the case of measuring a ratio (average value of $T_p$/average value of $T_v$) of an average value (μm) of thicknesses $T_p$ of the surface protective layer at the projection portions to an average value (μm) of thicknesses $T_v$ of the surface protective layer at the recess portions. The decorative resin molded article of the present invention exhibits excellent design feeling due to appearance based on such an uneven shape of the surface and further excellent abrasion resistance. About this mechanism, it is considered that as the uneven shape of the surface protective layer of the decorative resin molded article satisfies the relation of average value of $T_p$/average value of $T_v$ 0.45, a difference in gloss caused by a difference in thickness is generated between the recess portion 2a and the projection portion 2b of the surface protective layer 2 and it looks having stereoscopic feeling more than the actual height difference of the uneven shape as described above. In addition, as the uneven shape satisfies the relation of 0.20 average value of $T_p$/average value of $T_v$, it is considered that it is suitably suppressed that the thicknesses $T_p$ of the surface protective layer 2 at the projection portions 2b are insufficient and the abrasion resistance is diminished as described above. FIG. 3 illustrates a cross-sectional structure of an aspect of the decorative resin molded article of the present invention. Incidentally, FIG. 3 is a schematic cross-sectional diagram of a decorative resin molded article in which the decorative sheet having the lamination configuration illustrated in FIG. 2 and a molded resin layer 5 are integrated.

Incidentally, with regard to the surface protective layer 2 of the decorative resin molded article of the present invention, the method for determining the average value (μm) of thicknesses $T_v$ of the surface protective layer at the recess portions and the average value (μm) of thicknesses $T_p$ of the surface protective layer at the projection portions is the same as that in the decorative sheet of the present invention.

With regard to the decorative resin molded article of the present invention, the average value (μm) of the thicknesses $T_p$ at the projection portions 2b of the surface protective layer 2 to be the target of measurement is not particularly limited as long as the relation of average value of $T_p$/average value of $T_v$ is satisfied but is preferably 3 μm or more, more preferably about 3 to 10 μm, and still more preferably about 5 to 8 μm from the viewpoint of still further improving the design feeling due to appearance and the abrasion resistance.

In addition, with regard to the decorative resin molded article of the present invention, the average value (μm) of the thicknesses $T_v$ at the recess portions 2a of the surface protective layer 2 to be the target of measurement is not particularly limited as long as the relation of average value of $T_p$/average value of $T_v$ is satisfied but is preferably 30 μm or less, more preferably about 10 to 26 μm, and still more preferably about 15 to 20 μm from the viewpoint of still further improving the design feeling due to appearance and the abrasion resistance.

In addition, with regard to the decorative resin molded article of the present invention, the average of the distances w (distance in the direction perpendicular to the thickness direction of the decorative resin molded article) between the recess portions 2a of the surface protective layer 2 to be the target of measurement and the projection portions 2b adjacent to the recess portions 2a is not particularly limited but is preferably about 10 to 300 μm, more preferably about 50 to 250 μm, and still more preferably about 100 to 200 μm from the viewpoint of still further improving the design feeling due to appearance and the abrasion resistance. Incidentally, the distance w is a value measured from a cross section in the thickness direction of the decorative resin molded article as illustrated in FIGS. 1 and 2.

The decorative resin molded article of the present invention can be produced by a method including a step of forming a molded resin layer by injecting a resin on the base material layer side of the decorative sheet of the present invention. Specifically, the decorative resin molded article of the present invention can be fabricated using the decorative sheet of the present invention by various injection molding methods such as an insert molding method, an injection molding simultaneous decorating method, a blow molding method, and a gas injection molding method.

In a case in which the decorative sheet of the present invention is provided with the above-described unevenness protective film layer, it is possible to suitably exert the effect of suppressing that the uneven shape is damaged at the time of injection molding by subjecting the decorative sheet of the present invention to various injection molding methods to fabricate a decorative resin molded article with unevenness protective film layer. A preferred example of the molded resin layer 5 constituting the decorative resin molded article of the present invention is an injected resin layer formed by injection molding. Among these injection molding methods, an insert molding method and an injection molding simultaneous decorating method are preferable. In other words, the decorative sheet of the present invention is suitably used in the insert molding method or the injection molding simultaneous decorating method.

In the insert molding method, in the vacuum molding step, the decorative sheet of the present invention is first vacuum molded (offline pre-molded) into a molded article surface shape using a vacuum mold in advance and then the extra part is trimmed, if necessary, to obtain a molded sheet. This molded sheet is inserted into an injection mold, the injection mold is clamped, a resin in a fluid state is injected into the mold and solidified, and the base material layer 1 side of the decorative sheet is integrated with the outer surface of the resin molded product simultaneously with the injection molding, whereby a decorative resin molded article is produced.

More specifically, the decorative resin molded article (or the decorative resin molded article with unevenness protective film layer) of the present invention is produced by an insert molding method including the following steps.

A vacuum molding step of molding the decorative sheet of the present invention into a three-dimensional shape using a vacuum mold in advance, a step of trimming the extra part of the vacuum-molded decorative sheet to obtain a molded sheet, and a step of inserting the molded sheet obtained in the above step into an injection mold, closing the injection mold, injecting a resin in a fluid state into the mold, and integrating the resin and the molded sheet.

In the vacuum molding step in the insert molding method, the decorative sheet may be heated and thus molded. The heating temperature at this time is not particularly limited, and may be appropriately selected depending on the kind of resin constituting the decorative sheet, the thickness of the decorative sheet, and the like, but can be set to usually about 100° C. to 250° C. and preferably about 130° C. to 200° C., for example, in the case of using an ABS resin film as the base material layer. Moreover, in the integration step, the temperature of the resin in a fluid state is not particularly limited but can be set to usually about 180° C. to 320° C. and preferably about 220° C. to 280° C.

In addition, in the injection molding simultaneous decorating method, the decorative sheet of the present invention is disposed in a female mold which is used as a vacuum mold as well and is provided with a suction hole for injection molding, pre-molding (in-line pre-molding) is performed using this female mold, the injection mold is clamped, the resin in a fluid state is injected and filled into the mold and solidified, and the base material layer 1 side of the decorative sheet of the present invention is integrated with the outer surface of the resin molded product simultaneously with the injection molding, whereby a decorative resin molded article is produced.

More specifically, the decorative resin molded article (or the decorative resin molded article with unevenness protective film layer) of the present invention is produced by an injection molding simultaneous decorating method including the following steps.

A step of installing the decorative sheet of the present invention so that the base material of the decorative sheet faces the molding surface of the movable mold having a molding surface in a predetermined shape, then performing vacuum suction from the movable mold side as well as heating and softening the decorative sheet, and bringing the softened decorative sheet into close contact with the movable mold along the molding surface of the movable mold to pre-mold the decorative sheet, an injection molding step of clamping the movable mold having the decorative sheet in close contact therewith along the molding surface and the fixed mold and injecting, filling and solidifying the resin molded material in a fluid state in the cavity formed by both molds to laminate and integrate the formed resin molded body and the decorative sheet, and a step of separating the movable mold from the fixed mold and taking out a resin molded body in which the entire layers of decorative sheet are laminated.

In the pre-molding step in the injection molding simultaneous decorating method, the heating temperature of the decorative sheet is not particularly limited, and may be appropriately selected depending on the kind of resin constituting the decorative sheet, the thickness of the decorative sheet, and the like, but can be set to usually about 70° C. to 130° C. in the case of using a polyester resin film and an acrylic resin film as the base material layer. Moreover, in the injection molding step, the temperature of the resin in a fluid state is not particularly limited but can be set to usually about 180° C. to 320° C. and preferably about 220° C. to 280° C.

In addition, the decorative resin molded article of the present invention can also be fabricated by a decorative method (overlay method) in which the decorative sheet of the present invention is pasted onto a three-dimensional resin molded body (molded resin layer) prepared in advance such as a vacuum press-bonding method.

In the overlay method, the decorative sheet of the present invention and a resin molded body are first installed in a vacuum press-bonding machine including a first vacuum chamber located on the upper side and a second vacuum chamber located on the lower side so that the decorative sheet is on the first vacuum chamber side and the resin molded body is on the second vacuum chamber side and the base material layer 1 side of the decorative sheet faces the resin molded body side, and the two vacuum chambers are evacuated. The resin molded body is installed on a lifting platform which is provided on the second vacuum chamber side and can be moved up and down. Next, the molded body is pressed against the decorative sheet using the lifting platform as well as the first vacuum chamber is pressurized and the decorative sheet is pasted to the surface of the resin molded body while being stretched by the pressure difference between the two vacuum chambers. Finally, the two vacuum chambers are opened to the atmospheric pressure, and the extra part of the decorative sheet is trimmed if necessary, whereby the decorative resin molded article of the present invention can be obtained.

In the overlay method, it is preferable to include a step of heating the decorative sheet in order to soften the decorative sheet and to enhance the moldability before the step of pressing the molded body against the decorative sheet. The overlay method including this step is called a vacuum hot press-bonding method. The heating temperature in this step may be appropriately selected depending on the kind of resin constituting the decorative sheet, the thickness of the decorative sheet, and the like, but can be set to usually about 60° C. to 200° C. in the case of using a polyester resin film and an acrylic resin film as the base material layer.

In the decorative resin molded article of the present invention, the molded resin layer may be formed by selecting a molded resin depending on the application. The molded resin may be a thermoplastic resin or a thermosetting resin.

Examples of the thermoplastic resin to be used as the molded resin include polyolefin-based resins such as polyethylene and polypropylene, ABS resin, styrene resin, polycarbonate resin, acrylic resin, and vinyl chloride resin. These thermoplastic resins may be used singly or in combination of two or more kinds thereof.

In addition, examples of the thermosetting resin to be used as the molded resin include urethane resin and epoxy resin. These thermosetting resins may be used singly or in combination of two or more kinds thereof.

In a case in which the decorative sheet of the present invention has an unevenness protective film layer, a decorative resin molded article can be obtained by peeling off and removing the unevenness protective film layer from the decorative resin molded article with unevenness protective film layer of the present invention. Moreover, in the decorative resin molded article with unevenness protective film layer, the unevenness protective film layer plays a role as a protective sheet for the decorative resin molded article, thus may be stored as it is without being peeled off after production, and may be peeled off at the time of use. It is possible to prevent the decorative resin molded article from being damaged due to rubbing at the time of transportation by using the unevenness protective film layer in such an aspect.

The decorative sheet of the present invention has an uneven shape on the surface of the surface protective layer 2, and thus it is preferable to employ the overlay method in the producing process of the decorative resin molded article from the viewpoint of effectively suppressing disappearance of the uneven shape. Moreover, in the case of employing the insert molding method and the injection molding simultaneous decorating method, a decorative sheet having the unevenness protective film layer described above is preferable.

The decorative resin molded article of the present invention has an excellent design and thus can be utilized, for example, as interior materials or exterior materials for vehicles such as motor vehicles; artificial materials such as skirting boards and curbs; fittings such as window frames and door frames; interior materials for buildings such as walls, floors, and ceilings; housings for home appliances such as television receivers and air conditioners; and containers.

EXAMPLES

Hereinafter, the present invention will be described in detail with reference to Examples and Comparative Examples. However, the present invention is not limited to Examples.

Examples 1 and 2 and Comparative Examples 1 to 3

An ABS resin film (thickness: 200 µm) was used as the base material layer. A decorative layer (thickness: 1 µm)

having a wood grain picture was formed on the base material layer using an ink composition containing an acrylic resin by gravure printing. A resin composition for primer layer containing a binder resin composed of a two-component curable resin containing 100 parts by mass of a main agent (acrylic polyol/urethane, mass ratio: 9/1) and 7 parts by mass of a curing agent (hexamethylene diisocyanate) was applied on the decorative layer and dried to form a primer layer having a thickness of 1 μm, thereby obtaining a laminate in which the base material layer/decorative layer/primer layer were laminated in order. A stainless steel mirror plate having an arithmetic average roughness Ra of 0.05 μm was disposed on the surface on the base material layer side of the laminate obtained, an embossing plate having a plate depth of 50 μm (having a uneven shape on which a carbon mesh picture was formed) was disposed on the primer layer side, and hot pressing was performed for 10 minutes under conditions of a temperature of 150° C. and a pressure of 0.5 MPa. Next, an ionizing radiation curable resin composition having a composition to be described later was applied onto the primer layer on which the uneven shape was formed by bar coating, thereby forming an uncured resin layer. At this time, in consideration of the uneven shape to be formed by the embossing plate, the thickness of the uncured resin layer to be formed on the recess portions and projection portions of the uneven shape was adjusted by adjusting the viscosities of the ionizing radiation curable resin compositions in Examples 1 and 2 and Comparative Examples 1 to 3, respectively. Next, the uncured resin layer was irradiated with an electron beam having an accelerating voltage of 165 kV and a radiation dose of 50 kGy (5 Mrad) and a surface protective layer was thus provided, thereby obtaining each decorative sheet having a laminated configuration as illustrated in FIG. 2.

The decorative sheets of Examples 1 and 2 and Comparative Examples 1 to 3 were cut in the thickness direction, and the cross sections in the thickness direction were observed under a scanning electron microscope (SEM). Next, in the SEM images of the cross-sections in the thickness direction of the surface protective layers, the uneven shape in which a pattern including a projection portion and a recess portion adjacent to each other was repeated on the surface side was confirmed. Next, the thicknesses $T_v$ of the surface protective layer at three recess portions at which three patterns formed by the projection portions and recess portions adjacent to each other of the uneven shape were continuous and the thicknesses $T_p$ of the surface protective layer at three projection portions were measured (see the schematic diagram illustrated in FIG. 1). In addition, with regard to the three places at which the thickness was measured, the average values of $T_v$ and $T_p$, the ratio thereof (average value of $T_p$/average value of $T_v$), the average of the distances w (the direction perpendicular to the thickness direction) between the recess portion having the thickness $T_v$ and the projection portion which had the thickness $T_p$ and was adjacent to the recess portion were calculated. The results are presented in Table 1.

(Ionizing Radiation Curable Resin Composition)

Bifunctional urethane acrylate having polycarbonate skeleton (weight average molecular weight; 10,000): 95 parts by mass Tetrafunctional urethane acrylate (weight average molecular weight; 6,000): 5 parts by mass <Evaluation 1 on Visual Design Feeling>

The surface on the surface protective layer side of each decorative sheet obtained above was visually observed, and the stereoscopic design feeling was evaluated based on the shadows and the like observed by the uneven shape according to the following criteria. The results are presented in Table 1.

A: Shadows are sufficiently expressed on the surface of the decorative sheet and stereoscopic design feeling when the decorative sheet was irradiated with oblique light can be sufficiently confirmed.

C: Shadows on the surface of the decorative sheet are wholly weak, or shadows are insufficient due to the light irradiated to the recess portions of the uneven shape when the decorative sheet was irradiated with oblique light, and stereoscopic design feeling is not sufficiently attained.

<Evaluation 1 on Abrasion Resistance>

The surface on the surface protective layer side of each decorative sheet obtained above was subjected to a Taber abrasion test (CS10, 500 gf load, 400 rotations), the appearance after the test was visually observed, and the abrasion resistance was evaluated according to the following criteria. The results are presented in Table 1.

A: Slight wear is observed on the surface protective layer.

B: Wear is observed on the surface protective layer and a part of the decorative layer is exposed.

C: Wear is observed on the surface protective layer and the decorative layer and the base material layer is greatly exposed.

<Evaluation 1 on Moldability>

Each decorative sheet obtained above was heated using an infrared heater and softened until the sheet temperature reached 160° C. Next, vacuum molding was performed (maximum draw ratio: 100%) using a mold for vacuum molding to mold the internal shape of the mold. The decorative sheet after vacuum molding was cooled and then released from the mold. The appearance of the decorative sheet after molding was visually observed, and the moldability was evaluated according to the following criteria.

A: The decorative sheet followed the shape of the mold even at the most stretched portion and cracking and whitening were not observed from the surface protective layer.

B: The decorative sheet followed the shape of the mold even at the most stretched portion but cracking and whitening were slightly observed from the surface protective layer.

C: The decorative sheet followed the shape of the mold even at the most stretched portion but cracking and whitening were greatly observed from the surface protective layer.

TABLE 1

| Decorative sheet | Example 1 | Example 2 | Comparative Example 1 | Comparative Example 2 | Comparative Example 3 |
|---|---|---|---|---|---|
| Average value of $T_p$ (μm) | 5.2 | 3.9 | 6.8 | 1.5 | 12.6 |
| Average value of $T_v$ (μm) | 18.0 | 25.6 | 13.4 | 20.0 | 32.1 |
| Average value of $T_p$/average value of $T_v$ | 0.29 | 0.15 | 0.51 | 0.08 | 0.39 |
| Average of distances w between recess portions and projection portions (μm) | 160 | 160 | 60 | 200 | 150 |
| Design feeling due to appearance | A | A | C | A | A |

TABLE 1-continued

| Decorative sheet | Example 1 | Example 2 | Comparative Example 1 | Comparative Example 2 | Comparative Example 3 |
|---|---|---|---|---|---|
| Abrasion resistance | A | B | A | C | A |
| Moldability | A | B | A | B | C |

<Production of Decorative Resin Molded Article>

Decorative resin molded articles were fabricated using the decorative sheets of Examples 1 and 2 and Comparative Examples 1 to 3 by an overlay method including the following steps.

1. An acrylic adhesive material is applied to the back surface of the decorative sheet to provide an adhesive layer having a thickness of 40 μm.

2. The decorative sheet is placed on the upper side of the interior of the chamber and a molded resin is placed on the lower side thereof so as to face each other. At this time, the interior of the chamber is divided in an airtight manner by the decorative sheet.

3. The interior of the chamber is evacuated so that the upper and lower sides of the decorative sheet have the same vacuum pressure as well as the decorative sheet is heated using a hot platen heater.

4. When the decorative sheet temperature reaches 120° C., the upper side of the interior of the chamber is opened to the air, and the softened decorative sheet is allowed to follow (maximum draw ratio: 100%) the shape of the molded resin (ABS resin).

5. The decorative sheet temperature is maintained at 120° C. for 20 seconds, and the decorative sheet and the molded resin are bonded to each other via the adhesive layer.

6. The lower side of the interior of the chamber is opened to the air, and the decorative resin molded article is taken out from the chamber.

Next, the respective decorative resin molded articles were cut in the thickness direction, and the cross sections in the thickness direction were observed under a scanning electron microscope (SEM). Next, in the SEM images of the cross-sections in the thickness direction of the surface protective layers, the uneven shape in which a pattern including a projection portion and a recess portion adjacent to each other was repeated on the surface side was confirmed. Next, the thicknesses $T_v$ of the surface protective layer at three recess portions at which three patterns formed by the projection portions and recess portions adjacent to each other of the uneven shape were continuous and the thicknesses $T_p$ of the surface protective layer at three projection portions were measured (see the schematic diagram illustrated in FIG. 1). In addition, with regard to the three places at which the thickness was measured, the average values of $T_v$ and $T_p$ and the ratio thereof (average value of $T_p$/average value of $T_v$) were calculated. The results are presented in Table 2.

<Evaluation 2 on Visual Design Feeling>

The surface on the surface protective layer side of each decorative resin molded article obtained above was visually observed, and the stereoscopic design feeling was evaluated based on the shadows and the like observed by the uneven shape according to the following criteria. The results are presented in Table 2.

A: Shadows are sufficiently expressed on the surface of the decorative resin molded article and stereoscopic design feeling when the decorative sheet was irradiated with oblique light can be sufficiently confirmed.

C: Shadows on the surface of the decorative resin molded article are wholly weak, or shadows are insufficient due to the light irradiated to the recess portions of the uneven shape when the decorative resin molded article was irradiated with oblique light, and stereoscopic design feeling is not sufficiently attained.

<Evaluation 2 on Abrasion Resistance>

The surface on the surface protective layer side of each decorative resin molded article obtained above was subjected to a Taber abrasion test (CS10, 500 gf load, 400 rotations), the appearance after the test was visually observed, and the abrasion resistance was evaluated according to the following criteria. The results are presented in Table 2.

A: Slight wear is observed on the surface protective layer.

B: Wear is observed on the surface protective layer and a part of the decorative layer is exposed.

C: Wear is observed on the surface protective layer and the decorative layer and the base material layer is greatly exposed.

<Evaluation 2 on Moldability>

The appearance of each decorative resin molded article obtained above was visually observed, and the moldability of the decorative sheet by the overlay method was evaluated according to the following criteria. The results are presented in Table 2.

A: The decorative sheet followed the shape of the molded resin even at the most stretched portion and cracking and whitening were not observed from the surface protective layer.

B: The decorative sheet followed the shape of the molded resin even at the most stretched portion but cracking and whitening were slightly observed from the surface protective layer.

C: The decorative sheet followed the shape of the molded resin even at the most stretched portion but cracking and whitening were greatly observed from the surface protective layer.

TABLE 2

| Decorative resin molded article | Example 1 | Example 2 | Comparative Example 1 | Comparative Example 2 | Comparative Example 3 |
|---|---|---|---|---|---|
| Average value of $T_p$ (μm) | 6.2 | 6.6 | 8.0 | 3.1 | 14.7 |
| Average value of $T_v$ (μm) | 15.5 | 26.1 | 12.7 | 18.2 | 30.6 |
| Average value of $T_p$/average value of $T_v$ | 0.40 | 0.25 | 0.63 | 0.17 | 0.48 |
| Design feeling due to appearance | A | A | C | A | A |
| Abrasion resistance | A | B | A | C | A |
| Moldability | A | B | A | B | C |

DESCRIPTION OF REFERENCE SIGNS

1: Base material layer
2: Surface protective layer
2a: Recess portion
2b: Projection portion
3: Decorative layer
4: Primer layer
5: Molded resin layer
$T_v$: Thickness of recess portion of surface protective layer
$T_p$: Thickness of projection portion of surface protective layer

The invention claimed is:

1. A decorative sheet comprising: at least a base material layer and a surface protective layer located on a surface of the base material layer, wherein
the surface protective layer has a cross section in a thickness direction,
the cross section has an uneven shape in which a pattern including a projection portion and a recess portion adjacent to each other is repeated on the surface side,
a relation of 0.10≤average value of $T_p$/average value of $T_v$≤0.35 is satisfied in a case of measuring a ratio (average value of $T_p$/average value of $T_v$) of an average value (μm) of thicknesses $T_p$ of the surface protective layer at the projection portions to an average value (μm) of thicknesses $T_v$ of the surface protective layer at the recess portions, and
the decorative sheet further comprises a decorative layer between the surface protective layer and the base material layer.

2. The decorative sheet according to claim 1, wherein the surface protective layer is a cured product of an ionizing radiation curable resin composition containing polycarbonate (meth)acrylate.

3. The decorative sheet according to claim 1, wherein the average value (μm) of $T_p$ is 3 μm or more.

4. The decorative sheet according to claim 1, wherein the average value (μm) of $T_v$ is 30 μm or less.

5. The decorative sheet according to claim 1, further comprising a primer layer, wherein
the primer layer is in contact with a surface on the base material layer side of the surface protective layer.

6. A method for producing the decorative sheet according to claim 1, the method comprising:
a step of forming an uneven shape on one side of the base material layer; and
a step of forming the surface protective layer on a surface side on which the uneven shape is formed of the base material layer.

7. A decorative resin molded article comprising at least a molded resin layer, a base material layer, and a surface protective layer located on a surface, wherein
the surface protective layer has a cross section in a thickness direction,
the cross section has an uneven shape in which a pattern including a projection portion and a recess portion adjacent to each other is repeated on the surface side,
a relation of 0.20≤average value of $T_p$/average value of $T_v$≤0.45 is satisfied in a case of measuring a ratio (average value of $T_p$/average value of $T_v$) of an average value (μm) of thicknesses $T_p$ of the surface protective layer at the projection portions to an average value (μm) of thicknesses $T_v$ of the surface protective layer at the recess portions, and
the decorative resin molded article further comprises a decorative layer between the surface protective layer and the base material layer.

8. A method for producing a decorative resin molded article, the method comprising a step of laminating a molded resin layer by injecting a resin on the base material layer side of the decorative sheet according to claim 1.

9. The decorative sheet according to claim 2, wherein the average value (μm) of $T_p$ is 3 μm or more.

10. The decorative sheet according to claim 2, wherein the average value (μm) of $T_v$ is 30 μm or less.

11. The decorative sheet according to claim 3, wherein the average value (μm) of $T_v$ is 30 μm or less.

12. The decorative sheet according to claim 2, further comprising a primer layer, wherein
the primer layer is in contact with a surface on the base material layer side of the surface protective layer.

13. The decorative sheet according to claim 3, further comprising a primer layer, wherein
the primer layer is in contact with a surface on the base material layer side of the surface protective layer.

14. A method for producing the decorative sheet according to claim 2, the method comprising:
a step of forming an uneven shape on one side of the base material layer; and
a step of forming the surface protective layer on a surface side on which the uneven shape is formed of the base material layer.

15. A method for producing the decorative sheet according to claim 3, the method comprising:
a step of forming an uneven shape on one side of the base material layer; and
a step of forming the surface protective layer on a surface side on which the uneven shape is formed of the base material layer.

16. A method for producing a decorative resin molded article, the method comprising a step of laminating a molded resin layer by injecting a resin on the base material layer side of the decorative sheet according to claim 2.

17. A method for producing a decorative resin molded article, the method comprising a step of laminating a molded resin layer by injecting a resin on the base material layer side of the decorative sheet according to claim 3.

18. The decorative sheet according to claim 1, wherein the thickness of the base material layer is about 50 to 1000 μm.

19. The decorative sheet according to claim 2, wherein the thickness of the base material layer is about 50 to 1000 μm.

20. The decorative sheet according to claim 3, wherein the thickness of the base material layer is about 50 to 1000 μm.

* * * * *